Jan. 9, 1945.  E. L. MARTIN  2,367,173
PROCESS FOR MELT EXTRUDING SYNTHETIC POLYMERS
Filed Feb. 26, 1942
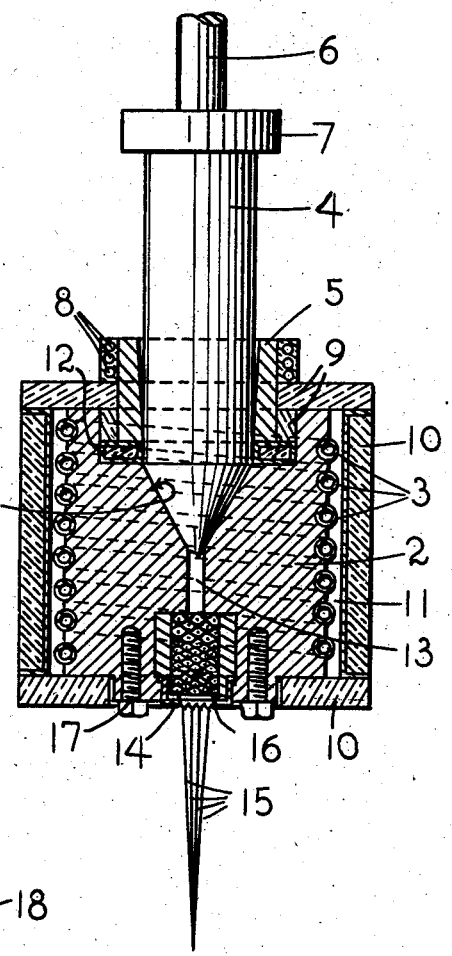
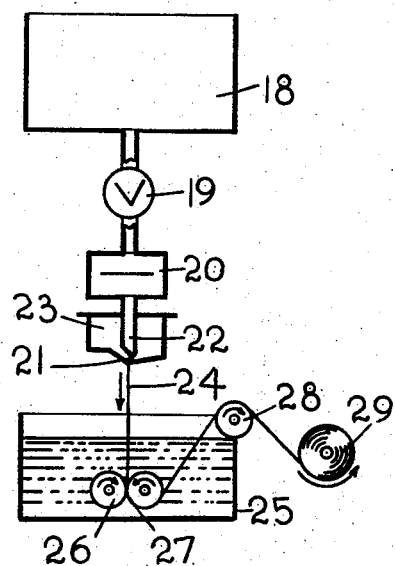
INVENTOR.
Elmore L. Martin
BY
R. F. Miller
ATTORNEY Patented Jan. 9, 1945

2,367,173

UNITED STATES PATENT OFFICE 2,367,173

PROCESS FOR MELT EXTRUDING SYNTHETIC POLYMERS

Elmore Louis Martin, Wilmington, Del.

Application February 26, 1942, Serial No. 432,494

3 Claims. (Cl. 18—54)

This invention relates to improvements in the manufacture of synthetic fibers, films, tapes, tubes and the like from normally solid polymers of ethylene.

In prior methods for preparing filaments, fibers, tubes, tapes, films and the like from linear polymers, the polymer is heated from 30° to 50° C. above its melting point and simultaneously extruded into the desired shape. It has now been discovered that in the production of fibers, tubes, films, tapes and the like from ethylene polymers which are normally solid, products which are superior in such desired properties as drawability, elastic modulus, tensile strength, etc., are obtained by heating the polymer to at least 85° C. above its melting point in the absence of oxygen.

An object of this invention is to provide methods for obtaining such improved filaments, fibers, tapes, tubes, films and the like from normally solid polymers of ethylene.

In one method of practicing this invention the polymer is placed in an apparatus adapted to melt the polymer, filter it, and extrude it by the application of pressure, the entire apparatus being maintained at a known and regulated temperature within the range of about 185° C. to about 450° C. The present process can be carried out in an apparatus of known type such as that described in the accompanying drawing wherein:

Figure 1 is an elevation, partly in section, of an apparatus suitable for extruding the ethylene polymer filaments in accordance with this invention, and Figure 2 is a similar view of a device designed to extrude films.

In Figure 1 the numeral 1 indicates the walls of a conically shaped melting chamber formed in the metal block 2 around which is wound a coil 3 which can be an electric heating coil or one heated by circulation of fluid therethrough. The polymer to be extruded is formed into a rod 4, the lower end of which is forced through a sealing ring 5 against the heated conical walls 1 by a mechanically or manually operated rod or plunger 6 provided with a flange 7 bearing against the top of the polymer rod 4. The sealing ring is provided with slightly tapering inner walls and with a cooling coil 8 which can be used when necessary to maintain the sealing ring 5 below the melting point of the polymer and thereby prevent melt losses. The numeral 9 indicates insulation covering the top of the block 2 and surrounding the sealing ring 5. The block 2 is also provided with insulation 10 at the bottom and sides, the latter being separated from the block 2 and surrounding coil by an air space 11. A metal liner 12 is provided to prevent erosion of the sealing ring insulation. The molten polymer passes from a channel 13 through screen packs or filters 14 from where it is forced as filament 15 through a spinneret 16 which, with the filter pack assembly, is held in place by bolts 17.

In Figure 2 the molten ethylene polymer contained in a reservoir 18 passes through a valve 19 to a filter pack or strainer 20 then through the extrusion slot 21 leading from the channel 22 in the extrusion hopper 23. The film 24 of polymer is rapidly cooled by quenching in a water bath contained in a tank 25 provided with a pair of pinch rolls 26 and 27 from which the continuously extruded film passes over a guide roll 28 to a wind-up roll 29.

In another embodiment of the invention the ethylene polymer is heated in an apparatus adapted to exclude oxygen to a temperature in the range of about 200° to 450° C. for a period of time varying from about 1 minutes up to about 6 hours, the polymer is then allowed to cool to room temperature and the treated polymer processed into films, fibers, tubes, filaments, tapes, and the like.

The following examples are illustrative of the practice of this invention.

Example I

Filaments are extruded from an ethylene polymer having a molecular weight of 20,000 by the following procedure:

This polymer, which has a melting point of 110° C., is pressure molded at 150° C. into a rod of 1 inch diameter and 8 inches in length. By the application of mechanical pressure of 2300 to 4600 lbs./sq. in. the polymer is forced through the melting chamber and through the screen pack shown in the drawing (Figure 1) and extruded from a spinneret containing 5 orifices, each 0.010 inch in diameter. The filaments are produced at a rate of 10 ft./min., collected on a bobbin running at two to three times the extrusion rate and subsequently drawn to the maximum extent possible in a water bath maintained at 80° C. The extrusion of the filaments is carried out at a temperature ranging from 195° C. to about 299° C. The yarns obtained are characterized by having a smooth surface, high tensile strength, and high elastic moduli and drawability.

Example II

Filaments are extruded from an ethylene polymer having a molecular weight of about 9000 by the following procedure:

The polymer, having a melting point of 100° C., is molded into a rod and extruded by the method used in Example I. Extrusion temperatures ranging from about 196° C. to about 300° C. and pressures varying from about 2000 to 3800 lbs./sq. in. are used in producing continuous filaments which are formed at the rate of 10 ft./min. and collected on a bobbin running at three to four times the extrusion rate. The filaments are then drawn to the maximum extent possible in a water bath held at 75° C. The filaments obtained are similar in physical properties to those of Example I.

Extrusion rates of about 10 ft./min. have been used in the above examples but it is to be understood that since the ethylene polymer cools and hardens quite rapidly much higher rates are possible, so long as the necessary extrustion pressures do not become prohibitive. The extrusion pressure is dependent upon the filtering means used as well as upon the extrusion temperature. Ordinarily, sufficient filtering action is obtained by using a pack of stainless steel screens, each consisting of a layer of 300 x 300 mesh screen supported by a layer of 100 x 100 mesh screen. Yarn wind-up rates as high as 500 ft./min. give good results. Actually, the effect of this variable is influenced largely by the wind-up rate-extrusion rate ratio. This ratio should be 2:1 to 4:1 for best results, although rates as high as 25:1 cause only a 25% reduction in tenacity. Higher ratios than 4:1 tend to orient the yarn during the spinning step so that subsequent drawing to the maximum extent possible produces a yarn of inferior quality.

*Example III*

An ethylene polymer of about 20,000 molecular weight is extruded into films by the following method:

The polymer after being melted at 272° C. under a nitrogen pressure of 35 lbs./sq. in. and subjected to vacuum to remove gas bubbles, is extruded in the apparatus shown in Figure 2 through a 3 inch by 0.30 inch slot orifice directly into cold water within the tank 10 about one-quarter of an inch below the extrusion slot. A constant tension is applied by the pinch rolls 26 and 27 positioned about 8 inches below the surface of the water. In this manner a smooth transparent film 3 inches wide and 15 mils thick is obtained at a speed of 100 ft./min. It has a tensile strength of 1060 lbs./sq. in., based upon the original dimensions.

*Example IV*

An ethylene polymer, having an extrusion rate of 0.018 g./min. at 150 lbs. pressure, as measured at 190° C. by forcing the molten polymer through a ⅛ inch orifice, is pressed into a film. The film thus obtained has a tensile strength of 1545 lbs./sq. in. with an elongation at break of 258%. The intrinsic viscosity (as measured at 85° C. in 2.5% solution in xylene) is 1.45 and the stiffness is $25.9 \times 10^{-3}$. This polymer is incompletely soluble in xylene at the boiling point.

Twenty grams of the above polymer is mixed with 200 cc. of freshly distilled tetrahydronaphthalene and heated in a closed reaction vessel in an atmosphere of nitrogen at 285° C. for 3 hours. The reaction vessel is cooled to about 90° C., and the product removed as a viscous solution. On cooling to room temperature, the polymer separates as a gelatinous mass, which is filtered off and macerated with three 250 cc. portions of petroleum ether (b. p. 60° C.). The solid is then dried on a steam bath in an atmosphere of nitrogen under vacuum. The dry material has an extrusion rate of 0.11 g./min. at 25 lbs. pressure and an intrinsic viscosity (measured at 85° C. in a 2.5% solution in xylene) of 0.91, a stiffness of $48.4 \times 10^{-3}$, and a tensile strength of 2085 lbs./sq. in. The elongation at break is 184%. The product is completely soluble in xylene at the boiling point.

*Example V*

An ethylene polymer having an intrinsic viscosity of 1.12 (measured as a 2.5% solution in xylene at 85° C.) and an extrusion rate of 0.043 g./min. at 25 lbs. pressure is pressed into a film. The film has a strength of 1515 lbs./sq. in., an elongation at break of 497%, and a stiffness of $11.5 \times 10^{-3}$. The polymer is soluble in xylene at the boiling point but the solutions are very viscous.

A sample of the above polymer is cut into narrow strips and packed into a glass tube of 22 mm. diameter sealed at one end and with the open end connected to a vacuum and a source of oxygen-free nitrogen. The tube is evacuated and the air replaced with nitrogen and then immersed in a vapor bath of boiling hexachlorobenzene (b. p. 309° C.). The material is heated for one hour, removed from the vapor bath, cooled to room temperature and the polymer removed from the tube. The treated polymer has an extrusion rate of 0.09 g./min. at 25 lbs. pressure. A pressed film shows a tensile strength of 1747 lbs./sq. in. with an elongation at break of 524%. The stiffness is $11.5 \times 10^{-3}$. The material has an intrinsic viscosity in xylene at 85° C. of 1.05. The product is soluble in hot xylene and films can be readily cast from such solutions.

The process of this invention is applicable to the processing of any normally solid polymer obtained by polymerizing ethylene alone or in a mixture containing ethylene as a substantial component. Such polymers are obtained by the processes of U. S. Patents 2,153,553, 2,188,465 and 2,200,429 or by polymerizing ethylene in an aqueous medium in the presence of a per-compound catalyst at temperatures in the range of 20° to 350° C. and under superatmospheric pressures of from 50 to about 3000 atmospheres.

In the process of this invention temperatures ranging from about 185° to about 450° C. can be used.

The time of treatment can vary from about one minute to as much as 6 hours with the optimum appearing to be inversely proportional to the temperature, i. e., short times of contact as, for instance, one minute at 400° C. giving results comparable to a 3 hour treatment at 285° C. The heat treatment can be carried out in any apparatus adapted to stand high temperatures. Thus it may be carried out in a closed reaction vessel, in a stainless steel coil of small diameter immersed in a lead bath, or in a glass tube immersed in a vapor bath. The essential feature is that the heat treatment be carried out in the absence of oxygen.

As illustrated in Examples I through III the heat treatment can be combined with the forming operation. In other words, the polymer can be heat-treated and processed into any desired shape as for example a thread, filament, tube, tape, or film in an apparatus such as that illustrated in the drawing.

The advantages of the present process are readily apparent by comparison of the properties of the treated and untreated products, as illustrated in the examples given. Thus, for example, when the procedure of Example I is repeated using temperatures in the range of those used in the prior process the yarn obtained is definitely rough. At these temperatures the maximum continuous draw-ratio and the tenacity in grams per denier is only slightly greater than half that obtained at 195° C. and approximately one-third that obtained at 272° C. and 299° C., respectively. Draw-ratio value decreases slightly at 295° C. but the tenacity remains about the same. The yarn obtained by using the high extrusion temperatures disclosed herein are also markedly improved in elasticity as determined by the time required for the yarn to recover from a definite amount of stretch, and is greatly improved with regard to absence of undesirable residual permanent stretch after the drawing operation. Thus, the force required to produce a 1% stretch in the yarn extruded at 222° C. and 299° C., respectively, is found to be about 10 or more times the force required to produce the same stretch in yarn extruded at the highest temperatures heretofore used. Conversely, the per cent elongation for a given force is found to be correspondingly less in the case of the present high temperature extruded yarn.

By reason of the above mentioned improvements in properties the present invention enhances the value of ethylene polymer filaments, films, yarns, tapes, and the like for uses to which these highly chemically inert products have been put. These uses include dental floss which is soft and flexible, tapered or cylindrical bristles which are used, for example, in rotary brushes for cleaning filter screens and brushes for use in plating and pickling baths; surgical sutures which can readily be sterilized by chemical means and are inert to water, body fluids and tissues; fishing leaders which since they float on water are of special value as fly leaders; textile yarns; and many types of useful screens which are highly resistant to deterioration during outdoor and ultra-violet exposure. Tubes can be used as casings around electrical conductors, as straws in the conveyance of liquids, etc. The filaments are usually used in their oriented state and in the case of bristles the setting treatment which consists of heating at constant length to a temperature approaching the melting point of the polymer is usually applied. Another useful application for these oriented filaments or fibers in the insulation of electrical conductors by winding the oriented fiber around the wire and then thoroughly shrinking it firmly into place by the application of heat.

Films prepared by the process of this invention can be modified with luminescent pigments such as zinc sulfide, strontium sulfide, calcium sulfide, etc. to give products which glow in the dark after having been exposed to light. These luminous films are highly resistant to moisture and are useful as markings for roads, light switches, stairways, fire exits, watch dials, etc., either alone or in conjunction with vapor discharge lamps.

As many apparently widely different embodiments of this invention may be made without departing from the spirit and scope thereof, it is to be understood that I do not limit myself to the specific embodiments thereof except as defined in the appended claims.

I claim:

1. In a process for producing films, filaments, tapes, ribbons, and the like from normally solid ethylene polymers, the step comprising extruding the said polymer in the absence of oxygen at a temperature which is at least 85° C. above the melting point of the polymer and which is not in excess of about 450° C.

2. In a process for extruding articles in the form of films, filaments, tapes, ribbons and the like from normally solid ethylene polymers, the steps comprising extruding the said polymer through an orifice in the absence of oxygen at a temperature which is at least 85° C. above the melting point of the polymer and which is not in excess of about 450° C., solidifying the extruded polymer, and exerting sufficient tension on the solidified article to impart thereto a rate of travel which is from twice to 25 times that at which said polymer is extruded.

3. In a process for extruding articles in the form of films, filaments, tapes, ribbons, and the like from normally solid ethylene polymers, the steps which comprise extruding the said polymer through an orifice, in the absence of oxygen, at a temperature which is at least 85° C. above the melting point of the polymer and which is not in excess of about 450° C., solidifying the extruded polymer, and then winding up the article thus obtained at a rate which is from two to four times greater than the rate of extrusion of the molten polymer at the orifice.

ELMORE LOUIS MARTIN.